(12) United States Patent
Nago

(10) Patent No.: US 8,995,355 B2
(45) Date of Patent: Mar. 31, 2015

(54) WIRELESS COMMUNICATION APPARATUS, METHOD AND A COMPUTER PROGRAM ENABLING SWITCHING OF COMMUNICATION CHANNEL BASED ON INTERFERENCE DETECTION

(75) Inventor: Hidetada Nago, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1010 days.

(21) Appl. No.: 12/629,323

(22) Filed: Dec. 2, 2009

(65) Prior Publication Data

US 2010/0165964 A1 Jul. 1, 2010

(30) Foreign Application Priority Data

Dec. 26, 2008 (JP) ................................ 2008-335222

(51) Int. Cl.
H04W 4/00 (2009.01)
H04W 28/20 (2009.01)
H04W 72/08 (2009.01)

(52) U.S. Cl.
CPC ............ *H04W 28/20* (2013.01); *H04W 72/082* (2013.01)
USPC ........... 370/329; 370/328; 370/330; 370/331; 370/332; 370/333

(58) Field of Classification Search
CPC .................................................... H04W 72/04
USPC ................. 370/338, 337, 339, 328, 329, 330; 455/517, 219, 225, 551, 560
See application file for complete search history.

(56) References Cited

U.S. PATENT DOCUMENTS

| 6,078,609 | A | 6/2000 | Nago | 375/202 |
|---|---|---|---|---|
| 2002/0080739 | A1* | 6/2002 | Kuwahara | 370/333 |
| 2004/0264425 | A1* | 12/2004 | Nishikawa | 370/338 |
| 2005/0058117 | A1* | 3/2005 | Morioka et al. | 370/346 |

(Continued)

FOREIGN PATENT DOCUMENTS

| JP | 2002-198867 | 7/2002 |
|---|---|---|
| JP | 2003-348635 A | 12/2003 |

(Continued)

OTHER PUBLICATIONS

U.S. Appl. No. 12/652,723, filed Jan. 5, 2010, Inventor Hidetada Nago.

(Continued)

*Primary Examiner* — Brandon Renner
*Assistant Examiner* — Abdelnabi Musa
(74) *Attorney, Agent, or Firm* — Fitzpatrick, Cella, Harper & Scinto

(57) ABSTRACT

A wireless communication apparatus that transmits data in certain communication interval to a receiving apparatus, using one or more communication channels among a plurality of adjacent communication channels, is provided. The apparatus includes: a setting unit configured to set the one or more communication channels for transmitting the data; a transmission unit configured to transmit the data using the one or more set communication channels; and a detection unit configured to detect interference with other wireless communication apparatuses, when the transmission unit transmits the data using the one or more set communication channels; wherein the setting unit changes the number of the one or more communication channels based on a time duration that the data transmission has been restrained due to the detected interference, and the communication interval.

10 Claims, 9 Drawing Sheets

(56) References Cited

U.S. PATENT DOCUMENTS

2006/0286935 A1* 12/2006 Utsunomiya et al. ........ 455/63.1
2007/0060159 A1   3/2007 Utsunomiya et al.
2008/0192644 A1   8/2008 Utsunomiya et al. ........ 370/252
2009/0061780 A1*  3/2009 Sekiya et al. ................ 455/63.1

FOREIGN PATENT DOCUMENTS

| | | |
|---|---|---|
| JP | 2004-260528 | 9/2004 |
| JP | 2005-333510 | 12/2005 |
| JP | 2006-217491 | 8/2006 |
| JP | 2007-005897 A | 1/2007 |
| JP | 2007-081836 A | 3/2007 |
| JP | 2007-096786 A | 4/2007 |
| JP | 2008-199102 | 8/2008 |

OTHER PUBLICATIONS

Japanese Office Action issued on Jan. 7, 2013, in counterpart Japanese Patent Application No. 2008-335222.

* cited by examiner

WIRELESS COMMUNICATION APPARATUS, METHOD AND A COMPUTER PROGRAM ENABLING SWITCHING OF COMMUNICATION CHANNEL BASED ON INTERFERENCE DETECTION

BACKGROUND OF THE INVENTION

1. Field of the Invention

The present invention relates to a wireless communication apparatus, a wireless communication method and a computer program.

2. Description of the Related Art

For realizing high speed wireless LAN communication, IEEE 802.11n standard that utilizes MIMO technology has been proposed. In IEEE 802.11n standard, wireless communication apparatus can select 20 MHz or 40 MHz as the communication bandwidth. In IEEE 802.11a, which is in the same 5 GHz band as the IEEE 802.11n, a single communication channel is stipulated to 20 MHz bandwidth. However, in practice, a wireless communication apparatus conformed to IEEE 802.11a standard conduct communication using a 26 MHz bandwidth. Therefore, interference is occurred not only with the same communication channel, but also among the adjacent communication channels. This is explained using the FIG. 8.

FIG. 8 is a figure showing the channel interval, as well as a figure for explaining the image of used frequency spectrum. Frequency spectrum 801 shows the frequency spectrum used for conducting communications using the channel N. Since the actual bandwidth of the frequency spectrum 801 is 26 MHz, there are frequency spectrum parts that overlap with the N+1 and N−1 channel frequency spectrum. Therefore, when there are two wireless communication apparatuses located within proximity, not only when the communication channels are equal, but also when communication channels are adjacent to each other, the interference is occurred. As a result, in carrier-sense before the data transmission, this may be seen as existence of a carrier and therefore the packet communication from one of the wireless communication apparatuses may be restrained.

Even when the packet transmission is restrained as mentioned above due to the interference, there may be cases that it is not a problem if the communication peer receives all the packets at the end. However, when data transmission is conducted within limited timeframe such as in video streaming, throughput is decrease due to the transmission restrain occurred by the adjacent channel communication; as a result, image quality decreasing effects such as image disturbance and delay is occurred.

As examples, the examples given in FIG. 9 and FIG. 10 are considered. FIG. 9 shows a figure for explaining the case of two wireless communication apparatuses conducting communication using two adjacent channels. FIG. 10 shows a figure for explaining the case of two wireless communication apparatuses conducting communication using the same communication channel. In FIG. 9, a Web camera 901 and a PC 902 are considered to be conducting video stream communication. The Web camera uses the channel N and the PC 902 uses the channel N+1. The Web camera 901 and the PC 902 is in adjacent, the transmission restrain cannot be ignored, which could lead to a significant through-put decrease. Moreover, as shown in the example of FIG. 10, even in case the Web camera 1001 and the PC 1002 is conducting communication within the same network, due to interference, decrease in the quality of the video stream is occurred.

To prevent such a throughput decrease, in Japanese Patent Laid-Open No. 2004-260528, when the interfering wave of the adjacent channel is detected, a technology for narrowing the bandwidth of the band pass filter which is used to pass the signal of the currently used channel, has been proposed. In Japanese Patent Laid-Open No. 2005-333510, when interference due to the adjacent station is detected, changing the channel to a channel that does not affected by the adjacent station, has been proposed. In Japanese Patent Laid-Open No. 2006-217491, when the carrier of the adjacent station is detected, a technology for changing the antenna directivity so that the antenna does not receive carrier of the adjacent station, has been proposed. In particular, there are also cases such as changing the communication channel in order to avoid interference as in Japanese Patent Laid-Open No. 2005-333510. However, in case of Wireless LAN, it is necessary to change the channel at the access point side; therefore, changing from the terminal side is not possible. Further, in case channel is changed while communicating, the communication will be cutoff. Further, when the antenna directivity has been changed, as in Japanese Patent Laid-Open No. 2006-217491, interferences due to other stations can be avoided, however avoiding interferences due to station itself cannot be conducted. Furthermore, in apparent when the signals of the other stations are not visible, the station itself will conduct communication regardless whether the other stations are communicating or not; therefore, collation occurs in the wireless domain, resulting increase in the communication error frequency.

The present invention proposes a technology that reduces the through-put decrease, even in case there are interferences with the other wireless communication apparatuses.

SUMMARY OF THE INVENTION

According to one aspect of the present invention, a wireless communication apparatus that transmits data in certain communication interval to a receiving apparatus, using one or more communication channels among a plurality of adjacent communication channels, comprises: a setting unit configured to set the one or more communication channels for transmitting the data; a transmission unit configured to transmit the data using the one or more set communication channels; and a detection unit configured to detect interference with other wireless communication apparatuses, when the transmission unit transmits the data using the one or more set communication channels; wherein the setting unit changes the number of the one or more communication channels based on a time duration that the data transmission has been restrained due to the detected interference, and the communication interval.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, the embodiments according to the present invention will be explained with reference to the attached figures. The present invention is applicable to a wireless communication apparatus that conducts communication by sending generally constant size data in generally constant communication intervals, using one communication channel and one of the two communication channels adjacent to aforementioned communication channel.

In the following embodiment, among the wireless communication apparatus of this kind, specifically a wireless communication apparatus compliant with the IEEE 802.11n standard is used as an example. As mentioned earlier, in IEEE 802.11n, among the 20 MHz bandwidth communication channels, communication can be conducted by using one channel or adjacent two channels. In case two communication channels are used, communication can be conducted with 40 MHz bandwidth. In the following embodiment, the wireless communication apparatus is considered to be sending constant size packets within each communication duration that has a constant time communication interval. Here, the time point that starts the communication interval is called communication-timing. In addition, in the present invention the destination of a packet can be any apparatus, therefore, it is indicated as a receiving apparatus, and in the following discussion the destination of the packet is abbreviated.

First Embodiment

Figure 1:
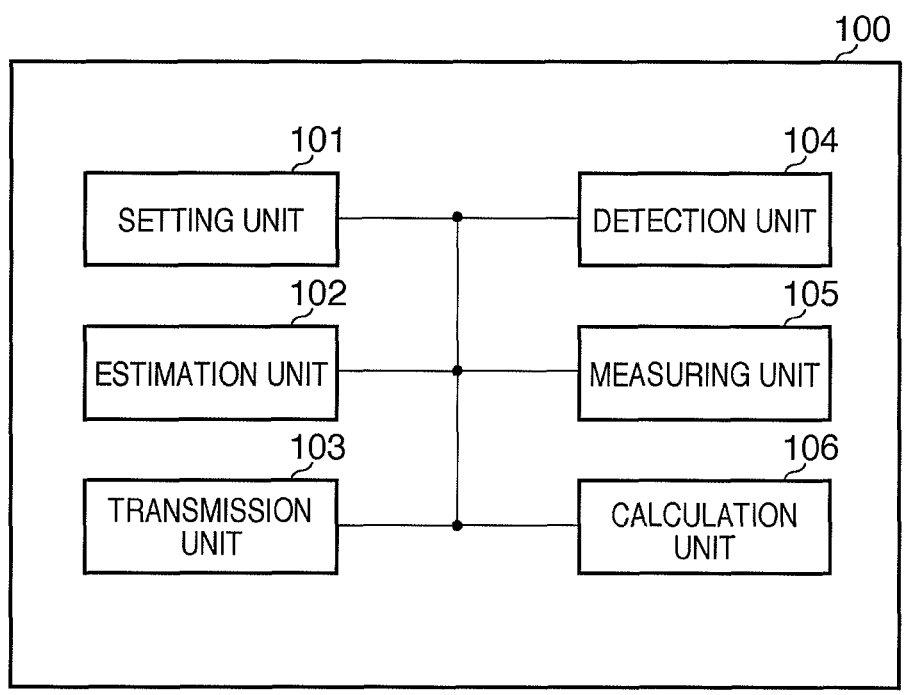
FIG. 1 is a figure showing an exemplary functional block diagram of the wireless communication apparatus 100 according to the present invention.
Figure 2:
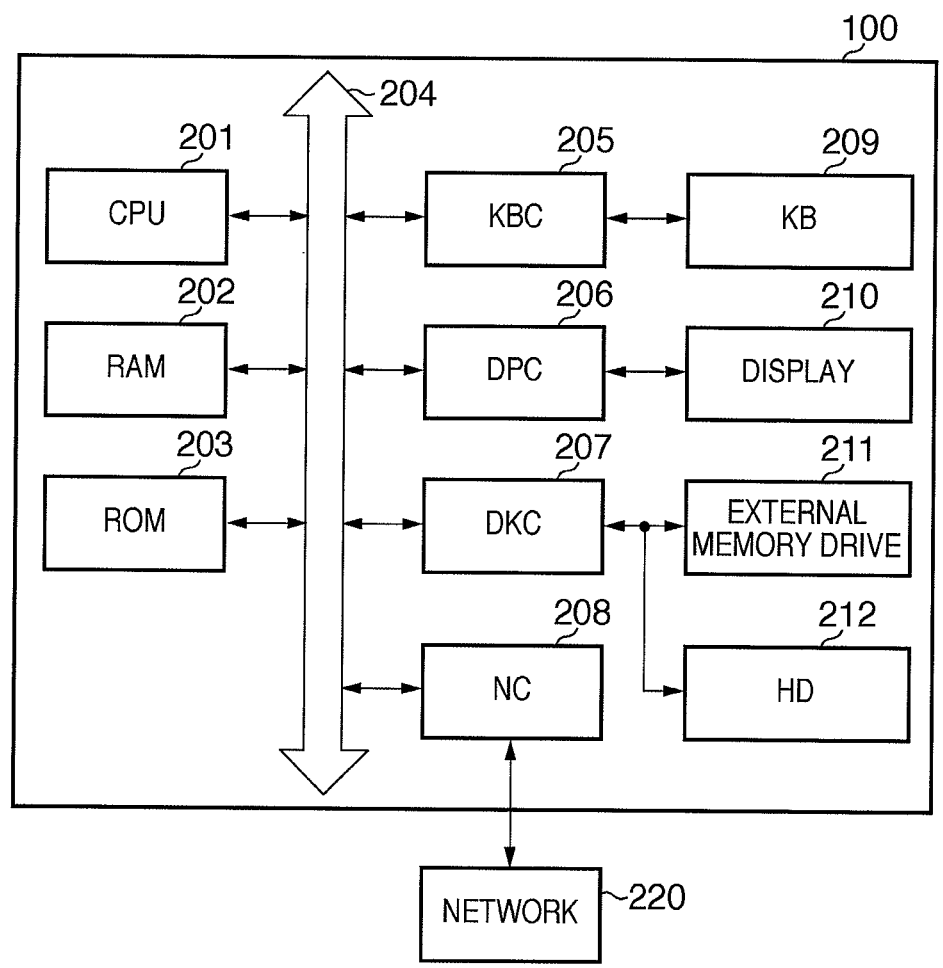
FIG. 2 is a figure showing an exemplary hardware block diagram of the wireless communication apparatus 100 according to the present invention.

The construction of the wireless communication apparatus 100 according to the present invention is described using the FIGS. 1 and 2. The FIG. 1 is a figure showing an exemplary functional block diagram of the wireless communication apparatus 100 according to the present invention. The wireless communication apparatus 100 comprises a setting unit 101, an estimation unit 102, a transmission unit 103, a detection unit 104, a measuring unit 105 and a calculation unit 106.

The setting unit 101 sets the communication channel for data communication. As discussed before, the setting unit 101 can choose the bandwidth as 20 MHz or 40 MHz. Moreover, the setting unit 101 sets which channel(s) is used for communication, among the plurality of channels. The estimation unit 102 estimates the time required for packet transmission.

Hereinafter, the time required for a packet transmission is called required-time. The required-time changes depending on whether the wireless communication apparatus 100 is using 20 MHz or 40 MHz as the bandwidth. When the wireless communication apparatus 100 is using 40 MHz, compared to the time required when 20 MHz is being used, the packets can be transmitted with half the time.

The transmission unit 103 communicates the packets using the channel(s) configured by the setting unit 101. The detection unit 104, using such as carrier-sense, detects interference due to carriers used by the other wireless communication apparatuses. In case the detection unit 104 detects an interference with a carrier signal of other wireless communication apparatus, the packets transmitted by the transmission unit 103 is restrained. As explained above, interference may occur not only when the other wireless communication apparatus 100 is using the same channel, but also when the other wireless communication apparatus is using adjacent channels. In case the wireless communication apparatus 100 is using the 40 MHz bandwidth, in other words two channels are being used, the detection unit 104 may conduct detection of interference for each of the used channels one by one.

The measuring unit 105 evaluates the time period the transmission is being restrained by the transmission unit 103 for each communication durations, due to interferences of carries used by other wireless communication apparatus. In case the wireless communication apparatus 100 is using 40 MHz bandwidth, in other words using two channels been used, the measuring unit 105 may calculate the restrained time for each channel one by one. The calculation unit 106 calculates the remaining time. The remaining time is the value obtained by subtracting the communication restrained time from the communication interval.

FIG. 2 is a figure showing an exemplary block diagram of the hardware of wireless communication apparatus 100. Here, FIG. 2 is only an example of the wireless communication apparatus 100 according to the present invention, all the parts that are represented is not necessary for the wireless communication apparatus 100.

The CPU 201, which is a microprocessor, controls the wireless communication apparatus 100 based on a program stored in a ROM 203, a hard disk (HD) 212 or a recording media set in an external memory drive 211. The CPU 201, as an example, may function as a setting unit 101, an estimation unit 102, and a calculation unit 106.

A RAM 202 functions as a work area of CPU 201, and saves the program stored in such as a ROM 203 and the hard disk 212. In the ROM 203, a recording media set into the external memory drive 211 or the hard disk 212, as represented in a flow chart which is explained later, a computer program executed by the CPU 201 and etc. are recorded.

205 is a keyboard controller (KBC) that controls the input from a keyboard (KB) 209, and pointers such as mouse which are not represented in figures. 206 is a display controller (DPC) that controls a display 210. 207 is a disk controller (DKC) that controls access to the hard disk 212 and the external memory drive 211; it reads out, each program, font data, user file, editing files and the like from each recording media. 208 is a network controller (NC) that conducts communication with the network 220. The network controller 208, as an example, functions as the transmission unit 103, the detection unit 104, and the measuring unit 105.

In addition, the CPU 201, as an example, executes processing of outline font expansion (rasterization) to assigned display information area of the RAM 202, or dedicated video memory (VRAM), and makes it possible to display on the display 210. Further, the CPU 201, based on the command given using the mouse cursor on the display 210, opens windows of recorded type for conducting various type of data processing.

Figure 3:
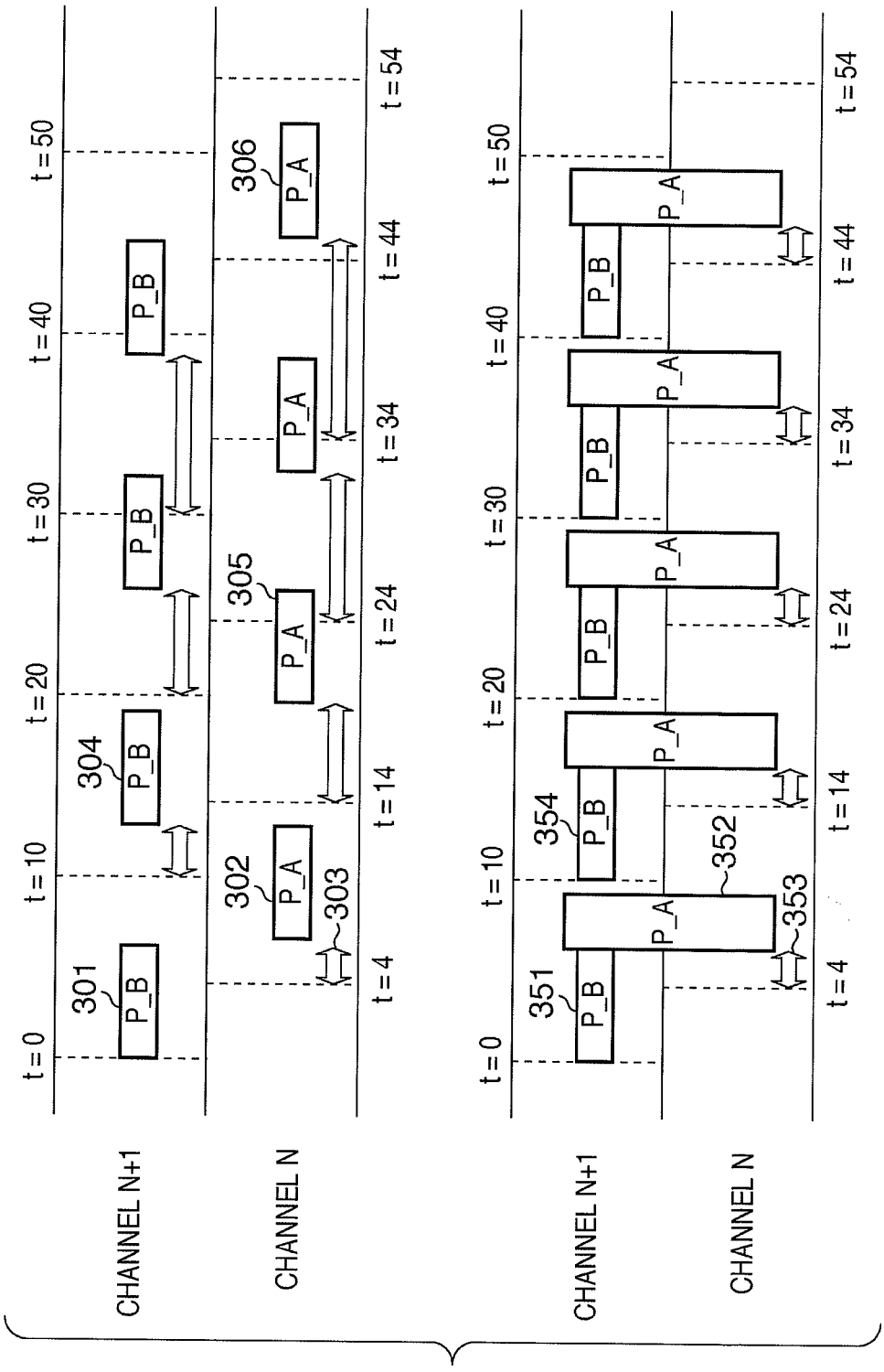
FIG. 3 is a figure for explaining an exemplary case where 40 MHz communication bandwidth can be used for communicating packets within each communication interval by the wireless communication apparatus.
Figure 4:
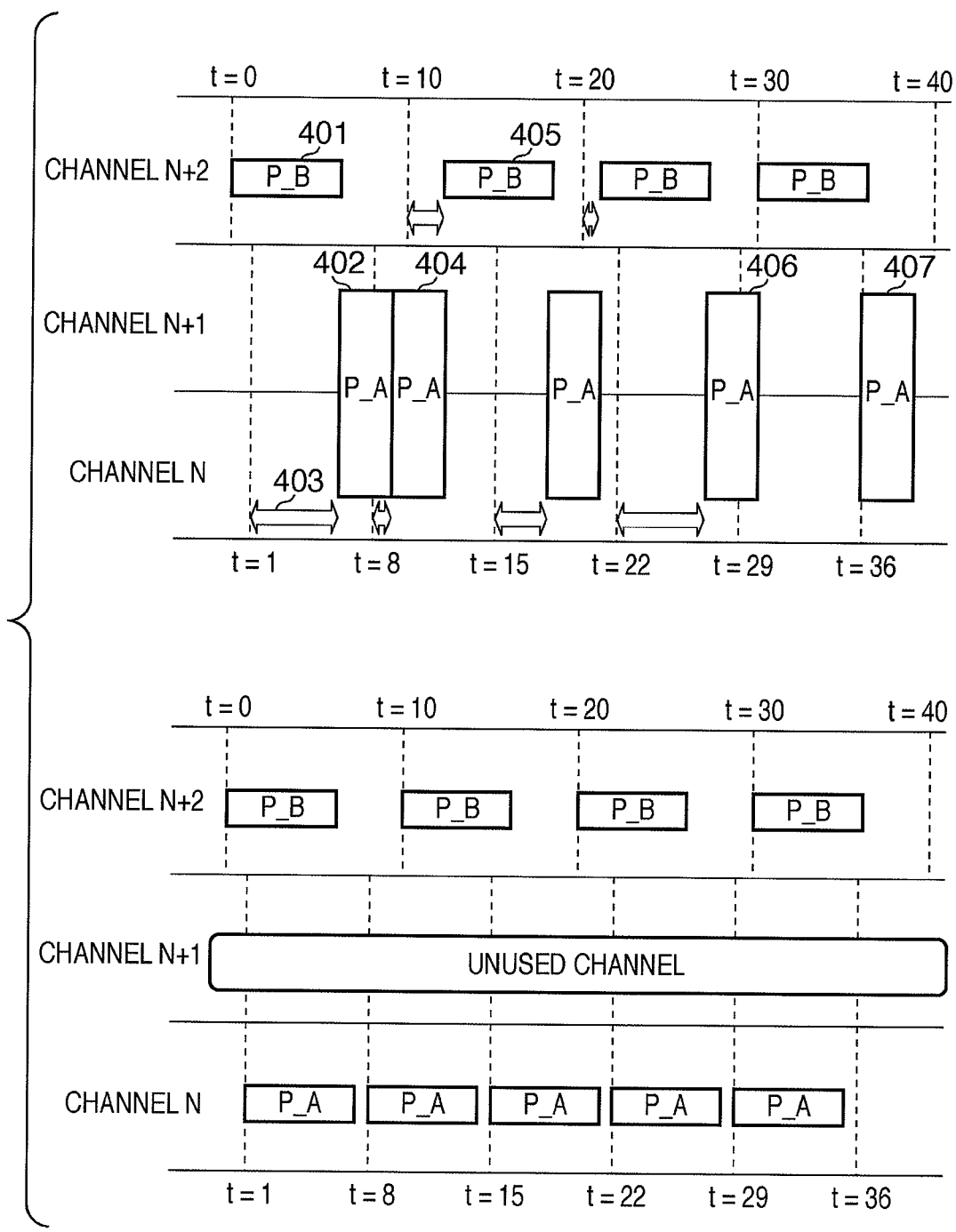
FIG. 4 is a figure for explaining an exemplary case where 20 MHz communication bandwidth can be used for packet communication within each communication interval by the wireless communication apparatus.

Next, by using the FIGS. 3 and 4, the effects of selecting the suitable bandwidth by the wireless communication apparatus will be described. FIG. 3 is a figure for explaining an exemplary case where 40 MHz communication bandwidth can be used for communicating packets within each communication interval by the wireless communication apparatus. FIG. 4 is a figure for explaining an exemplary case where 20 MHz communication bandwidth can be used for communicating packets within each communication interval by the wireless communication apparatus. In FIGS. 3 and 4 the wireless communication apparatus A and wireless communication apparatus B are considered to be communicating respectively. Further, the packets form the wireless communication apparatus A is represented as "P_A" and the packets form the wireless communication apparatus B is represented as "P_B".

In upper figure of FIG. 3, the wireless communication apparatus A, communicates packets that require communication time (required-time) of 7 ms, in each 10 ms communication interval, by using the channel N. Moreover, the wireless communication apparatus B, communicates packets that require communication time (required-time) of 6 ms, by using the channel N+1, with a communication interval of 10 ms. Moreover, it is considered that the communication-timing of the wireless communication apparatus A comes after communication-timing of 4 ms of the wireless communication apparatus B.

At the timing t=0, the wireless communication apparatus B starts communicating a packet 301. Since, the required time is 6 ms, this packet communication completes at the timing t=6. The wireless communication apparatus A, at the timing t=4, attempts to start communication of a packet 302, since wireless communication apparatus B is communicating in the adjacent channel, the communication is restrained due to interference. As a result, the communication of the packet 302 starts with a 2 ms delay 303 from the conventional communication-timing. Similarly, the other arrows shown in the figure indicates the delay from communication-timing. At the timing t=10, wireless communication apparatus B attempts to start communication of a packet 304; since wireless communication apparatus A is communicating the packet 302 the communication is restrained. As a result, the wireless communication apparatus B starts communicating from the timing t=13.

As above, the delay gets accumulated in both wireless communication apparatus A and wireless communication apparatus B. As result, for instance, when wireless communication apparatus A is conducting communication of a packet 305, packet communication cannot be completed within the communication interval. Further, when wireless communication apparatus A is conducting communication of a packet 306, packet communication cannot be started within the communication interval. As above, throughput of both wireless communication apparatuses gets reduced.

The lower figure of FIG. 3 is used for explaining a case similar to the upper figure of FIG. 3; it only differs from the upper figure from fact that the used bandwidth by the wireless communication apparatus A is 40 MHz. By using 40 MHz bandwidth, transmitting packets of the same size as the top figure of FIG. 3; it is possible to transmit packets in 3.5 ms.

At timing t=0, wireless communication apparatus B starts communication of a packet 351. Since the required-time is 6 ms, this packet transmissions completes in the timing t=6. Wireless communication apparatus A, at the timing t=4, attempts to start the communication of a packet 352, since the wireless communication apparatus B is still conducting communication in the adjacent channel, communication is restrained due to interference. As a result, with a delay 353 of 2 ms from the conventional communication-timing, communication of the packet 352 is started. Since communication of the packet 352 is completed in 3.5 ms, at timing t=9.5 communication of the packet 352 is completed. Therefore, wireless communication apparatus B can start communicating a next packet 354 from the timing t=10.

As above, by using the 40 MHz bandwidth, although a delay occurs, the wireless communication apparatus A, completing the packet communication within the communication duration. Further, wireless communication apparatus B is also able to complete packet communication within the communication duration.

As an example, when 20 MHz bandwidth is used, in comparison to the case when there is no interference from other wireless communication apparatus, the throughput is reduced by 50%; however, if 40 MHz bandwidth is used, the throughput reduction can be limit to 33%. The betterment effects are not limited to the wireless communication apparatus that changed the bandwidth, but also the effects applied similarly to the other wireless communication apparatus that happened to be the source of interference.

In upper figure of FIG. 4, the wireless communication apparatus A, communicates packets with required-time of 3 ms, in each 7 ms communication interval, by using the channel N and channel N+1. Moreover, the wireless communication apparatus B, communicates packets with required-time of 6 ms, in each 10 ms communication interval, by using the channel N+2. Furthermore, the timing of wireless communication apparatus A is coming after 1 ms of the communication-timing of the wireless communication apparatus B.

In timing t=0, the wireless communication apparatus B starts communication of a packet 401.

Since, the required time is 6 ms, this packet communication completes at the timing t=6. The wireless communication apparatus A, at the timing t=1, attempts to start communication of a packet 402, since wireless communication apparatus B is already communicating in the adjacent channel, the communication is restrained due to interference. As a result, the communication of packet 402 starts with a 5 ms delay 403 from the conventional communication-timing. Subsequently, after wireless communication apparatus A complete communication of the packet 402, at timing t=9, immediately starts communicating a next packet 404. At the timing t=10, wireless communication apparatus B attempts to start communication of a packet 405, since the wireless communication apparatus A is communicating a packet 404, the communication is restrained. As a result, the wireless communication apparatus B starts communication form the timing t=12.

Also in upper figure of FIG. 4, as an example, in case the wireless communication apparatus A communicating the packet 402 and a packet 406, completing the communication within the communication interval is not possible. Further, when the wireless communication apparatus A communicates a packet 407, starting the communication within the communication interval is impossible.

The lower figure of FIG. 4 is used for explaining a case similar to the top figure of FIG. 4; it only differs from the upper figure from fact that the used channel is channel N with bandwidth of 20 MHz. Because wireless communication apparatus A uses 20 MHz bandwidth, packets with similar size to the ones in upper figure can be communicated with 6 ms. In this case, interference between channel N and channel N+2 is not occurred; therefore, the wireless communication apparatus A and the wireless communication apparatus B both can conduct packet communication within communication-timing.

As described above in FIGS. 3 and 4, by using a proper bandwidth, high QoS communication can be realized, and the throughput of the total wireless system increases. In the wireless communication apparatus 100 according to the present invention, communication is conducted by selecting the proper bandwidth of 40 MHz or 20 MHz, for each communication duration. As an example, it is possible to apply the wireless communication apparatus 100 according to the present invention, to the wireless communication apparatus A of FIGS. 3 and 4.

Here, it is to be understood that the wireless communication apparatus B does not have to be a wireless communication apparatus 100 according to the present invention, since it is always communicating in 20 MHz bandwidth. For an example, as a standard that communicate within the same bandwidth as IEEE 802.11n IEEE 802.11a can be given; therefore, the wireless communication apparatus B can be an apparatus that is only compliant with IEEE 802.11a standard. Even in this case, by applying the present invention to the wireless communication apparatus A, the throughput of the wireless communication apparatus B is increased. The wireless communication apparatus 100 according to the present invention selects the bandwidth used for packet transmission. Therefore, the wireless communication apparatus 100 can function as an access point or a station communicating with an access point.

Figure 5:
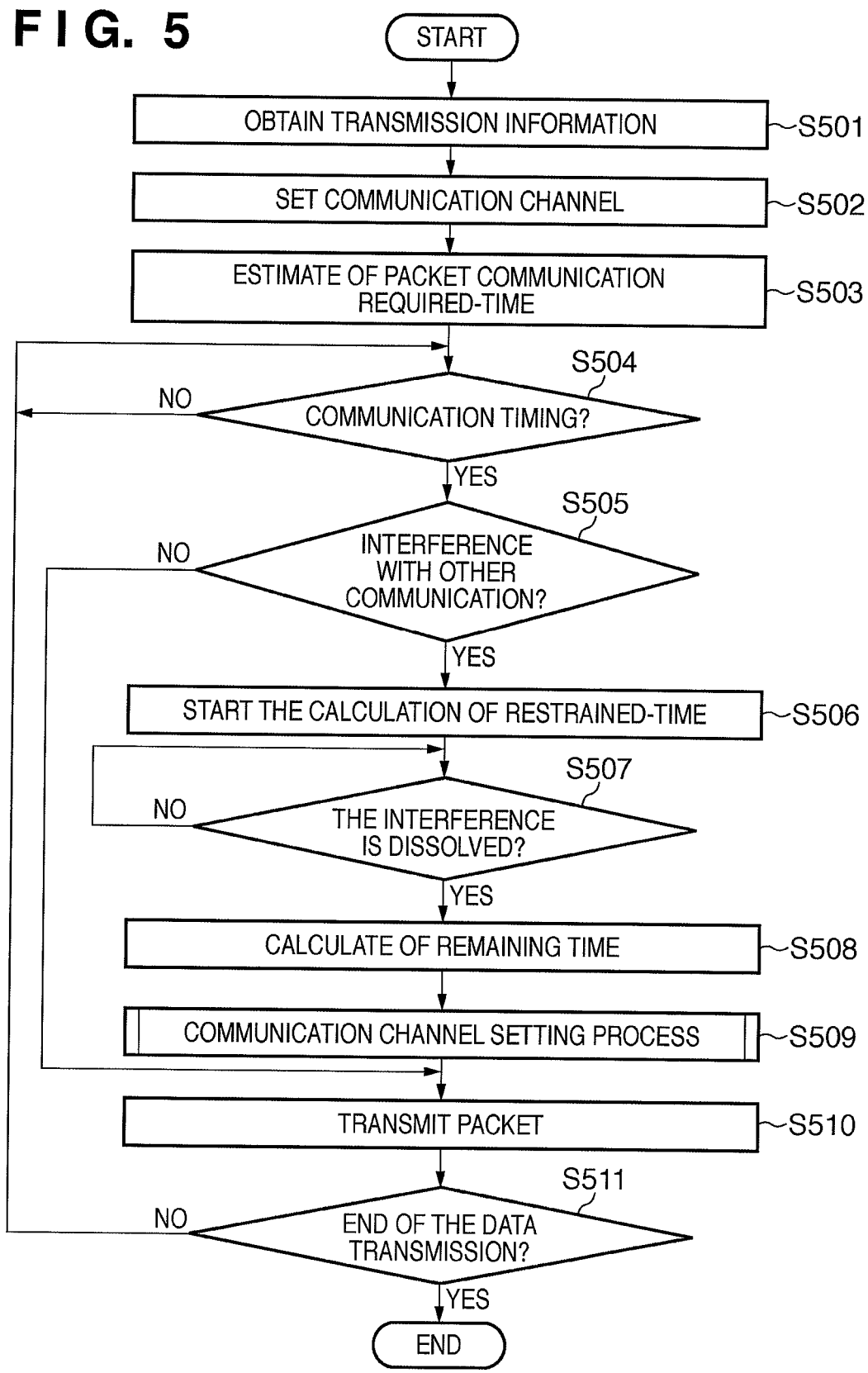
FIG. 5 is a flow chart showing an exemplary functional flow of the wireless communication apparatus 100 according to the present invention.

Subsequently, the functionality of wireless communication apparatus 100 will be discussed using the FIGS. 5 and 6. The FIG. 5 is a flowchart showing the operation of the wireless communication apparatus 100. The operations represented in the flow chart are implemented by executing the computer program read into the RAM 202 by the CPU 201.

In step S501, the transmission unit 103 obtains the transmission information. The transmission information is the information necessary for transmitting data by the wireless communication apparatus 100; as examples, it includes the address of the destination apparatus, data to be transmitted, communication interval of packet, and packet size. The way this information is obtained is not limited to a specific manner. As an example, it is possible for the wireless communication apparatus 100 to receive information specified by the user for each data to be transmitted, or calculate the necessary information based on predefined rules, by the transmission unit 103. Further, based on the data size to be communicated, communication interval of the packets and size of the packets can be calculated.

In step S502, the setting unit 101 sets the communication channel and the bandwidth to be used. As the communication channel, a random channel among the channels that is not used, or a user (or another apparatus) assigned channel, may be used. As the bandwidth, either 20 MHz or 40 MHz may be used.

In step S503, the estimation unit 102 estimates the required-time, which is the time interval from the start of sending a packet to the end of the sending of the packet, based on the bandwidth and the packet size. As an example, in step S502, in case 20 MHz is been set as the bandwidth, the estimation unit 102 estimates the required-time when the communication is conducted in 20 MHz. The estimation unit 102 may also estimate the require-time for bandwidth which is not been set at the same time. As an example, in step S502, in case the 20 MHz is set as the bandwidth, the estimation unit 102 may also estimate the required-time for the case communication is conducted in 40 MHz.

In step S504, the transmission unit 103 determines whether it is communication-timing or not. In case it the communication-timing ("YES" in step S504), the process proceeds to the step S505. In case it is not the communication-timing ("NO" in step S504) the process repeats the step S504.

In step S505, the detection unit 104, by such as carrier sensing, determines whether any interference with carriers used by other wireless communication apparatus is occurred or not. In case interface is not occurred ("NO" in step S505), the process proceeds to the step S510, the transmission unit 103 starts packet transmission. In this case, packet transmission can be conducted in the scheduled communication-timing. On the other hand, if interference is occurred (YES in step S505) the process proceeds to the step S506. As examples, in cases such as upper figure of FIG. 3 and upper figure of FIG. 4 interference occur.

In step S506, the measuring unit 105 starts restrained-time calculations. The restrained-time of a wireless communication apparatus is the time that packet communication of itself is restrained due to interference with other wireless communication apparatus. Here, incase bandwidth is set to 40 MHz, the measuring unit 105 may measure the restrained-time for each communication channel. As an example, the upper figure of FIG. 4, the packet 402 transmission of wireless communication apparatus A is been restrained by the packet 401 transmitted using the communication channel N+2. In this case, the channel that interferes with the channel N+2 is channel N+1 and channel N is not interfered with the channel N+2. Here, the detection unit 104, detects interference for each communication channel, and the measuring unit 105 measures restrained-time for each communication channel.

In step S507, the detection unit 104 determines whether interference is dissolved or not. In case the interference is dissolved ("YES" in step S507), the measuring unit 105 stops calculating restrained time, record the restrained-time, as an example, in RAM 202 etc. Then, the process proceeds to step S508. Similarly, even in this case restrained-time can be recorded for each communication channel. In case the interference is not been dissolved ("NO" in step S507), the process repeats the step S507.

In step S508, the calculation unit 106 calculates the remaining time of the present communication duration. The remaining time is the value obtained by subtracting the restrained-time, which is recorded in the step S507, from the communication interval. If packet communication could be completed within the remaining time, it means the wireless communication apparatus 100 can complete the packet communication within the communication duration.

In step S509, the wireless communication apparatus 100 conducts the communication channel setting process. Here, based on the remaining time calculated in the step S508, and the required time estimated in the step S503, communication channel setting is conducted, the details will be explained later. In step S510, the transmission unit 103 transmits using the communication channel that is set in step S509.

In step S511, the transmission unit 103 determines whether transmitting the data is finished or not; in case it is not finished ("NO" in step S511), the process returns to step S504 and wait for the next communication-timing. In case it is finished ("YES" in step S511), the process is concluded.

Subsequently, using the FIG. 6, the communication channel setting process in step S509 is explained in detail. FIG. 6 is a flow chart showing an exemplary communication channel setting process. The operation shown in the flowchart can be implemented by a computer program read from the RAM 202 and executed at the CPU 201.

In step S601, the setting unit 101 compares the required-time of the present bandwidth setting estimated in step S503, and remaining time calculated in step S508. In case of the required time is less than the remaining-time ("NO" in step S601), even in case the packet is transmitted in the present communication channel setting, the packet can complete communication within the communication-duration. Therefore, without changing the communication channel the process is concluded.

In case of the required time is larger than the remaining time ("YES" in step S601), the process proceeds to the step S602. In the step S602, the setting unit 101 determines whether the present bandwidth setting is equal to 40 MHz or not. In case the bandwidth is not set to 40 MHz ("NO" in step S602), in other words, in case the setting is 20 MHz, the process proceeds to the step S604. In this case, by changing the bandwidth 40 MHz, it may be possible to shortening the required-time and conducting packet transmission within the communication-duration. Here, in step S604, the setting unit 101, as the communication channel, a channel with bandwidth of 40 MHz including the preset communication channel is set.

Figure 7:
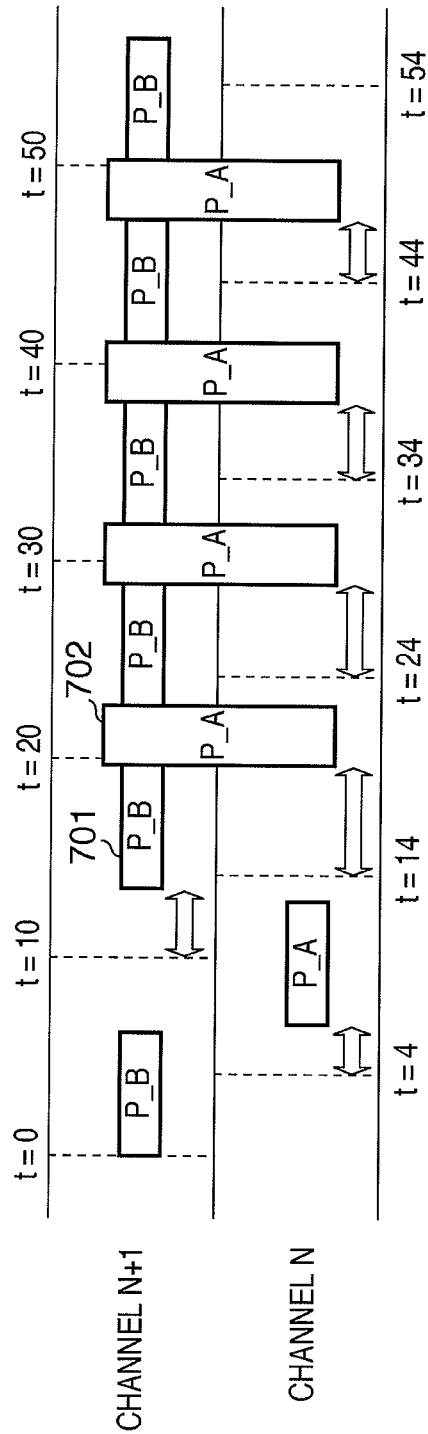
FIG. 7 shows an exemplary case where packet transmission within the communication duration is possible by changing the bandwidth to 40 MHz.
Figure 8:
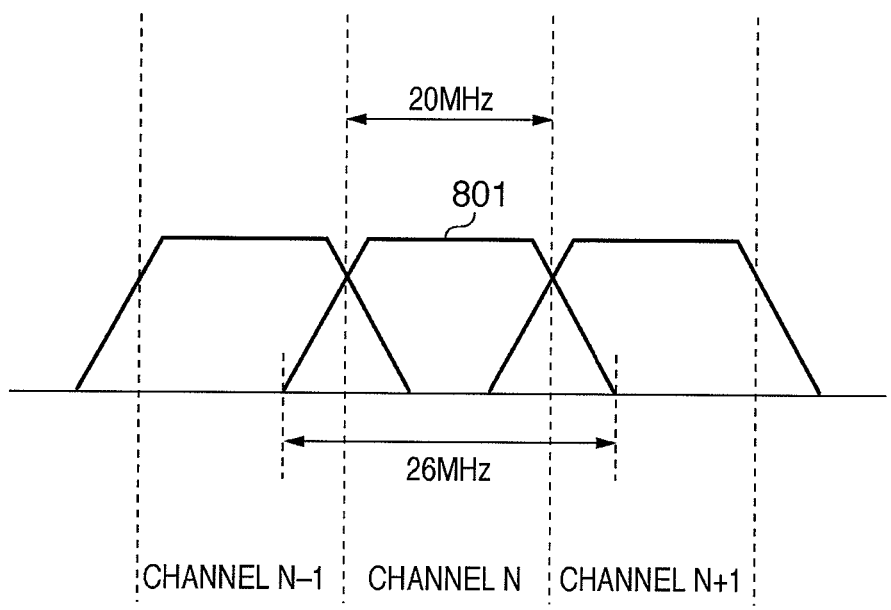
FIG. 8 shows the channel interval and an image of used frequency spectrum for explanation.
Figure 9:
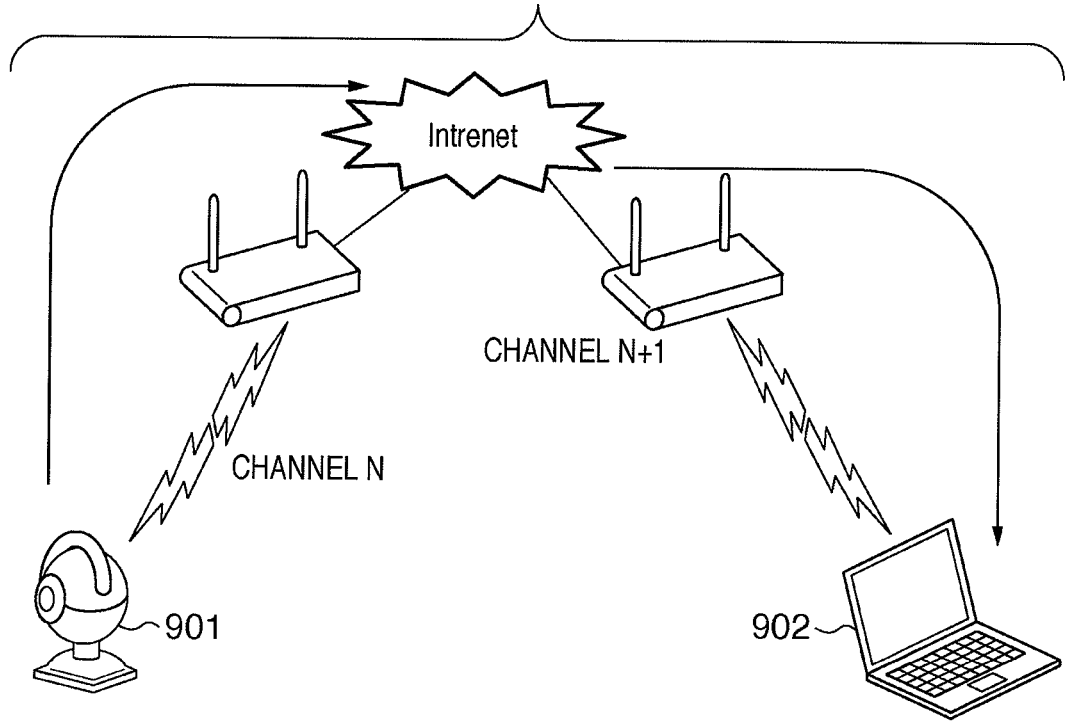
FIG. 9 shows a figure for explaining the case of two wireless communication apparatuses conducting communication using two adjacent channels.
Figure 10:
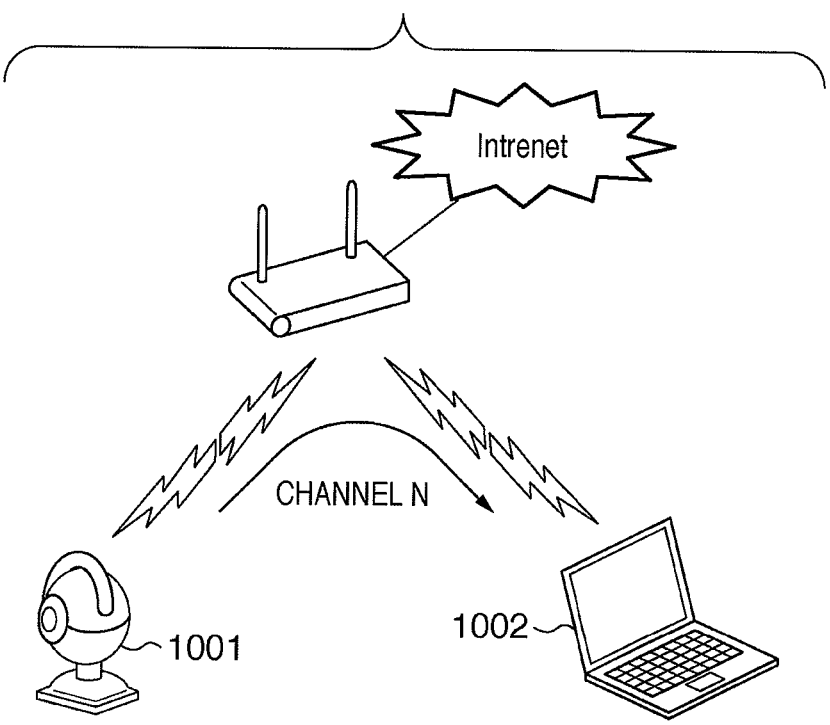
FIG. 10 shows a figure for explaining the case of two wireless communication apparatuses conducting communication using the same communication channel.

An example of this case is explained using the FIG. 7. In FIG. 7 shows an exemplary case where packet transmission within the communication duration is possible by changing the bandwidth to 40 MHz. Here, the status is the same as in FIG. 3, therefore, explanation is abbreviated. The wireless communication apparatus 100 according to the present invention is considered to be functioning as the wireless communication apparatus A in FIG. 3, and conducting packet communication using the communication channel N. That is, as the bandwidth 20 MHz is set.

Here, consider a case where timing t=14 is the communication-timing. In this case, the detection unit 104 detects that at channel N+1, the other wireless communication apparatus are conducting communication of the packet 701. Therefore, the transmission of packet 702 is restrained. When the transmission of packet 701 is concluded, the calculation unit 106 calculates the remaining time. As explained above in FIG. 3, the remaining time is shorter than the required time of transmission. Here, the setting unit 101 changes the bandwidth to 40 MHz, and then the transmission unit 103 transmits the packet 702. Due to the bandwidth change as explained above, the wireless communication apparatus 100 is able to complete communication of the packet 702 within the communication-duration.

By returning to the FIG. 6, in case the bandwidth setting is 40 MHz ("YES" in step S602), the process proceeds to the step S603. In step S603, the setting unit 101 compares the required-time and remaining time in case transmitted with a 20 MHz bandwidth. As explained using the FIG. 4, in case the MHz is been used as the bandwidth, compared to the case of 40 MHz bandwidth, although required-time become longer, there may be cases that is possible to prevent interference with other wireless communication apparatus. Therefore, the calculation unit 106, based on the channel communication restrained time calculated in step S506, calculates the remaining time in case each communication channel transmits the packet on its own.

The calculated remaining time for each communication channel is compared with the required-time in case 20 MHz bandwidth is being used as calculated in step S503. In case the ("NO" in step S603), by changing the bandwidth to 20 MHz, the wireless communication apparatus 100 can complete the packet communication within the communication duration. Here, in step S604, the setting unit 101 changes the packet communication setting of the communication channels by selecting one of the communication channels that satisfies the requirement of step S603. On the other hand, even when either of the channels are changed, in case the required time is longer than the remaining time ("YES" in step S603), the setting unit 101 concludes the process without updating the setting. Meanwhile, in case only one communication channel is interfering with a communication channel used by another wireless communication apparatus, the communication channel may be changed into the channel which is not interfered.

Figure 6:
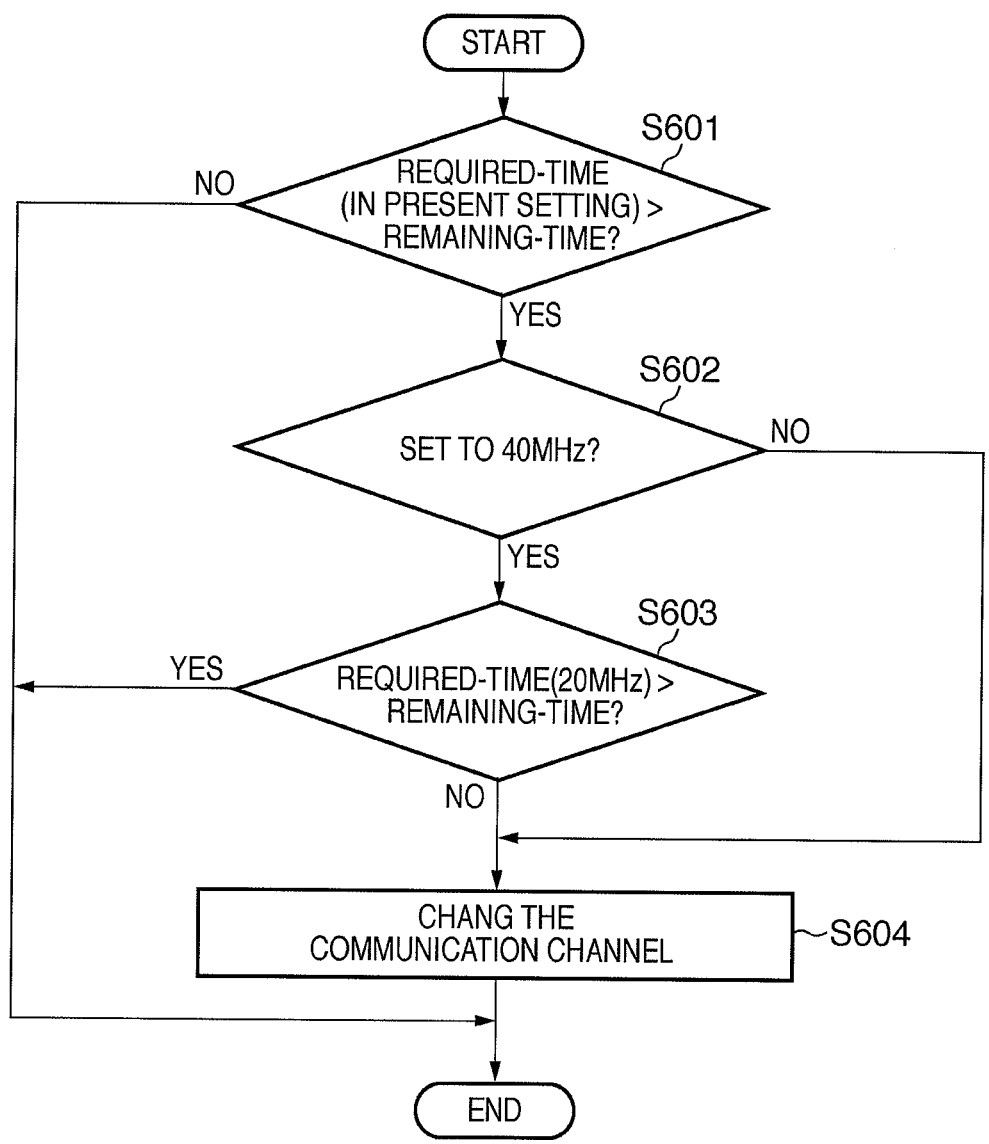
FIG. 6 is a flow chart showing an exemplary communication channel setting process according to the present invention.

The communication channel setting process shown in FIG. 6 may start by using the number of times communication is restrained within a predefined time due to carrier sense, or continuous number of times the communication is restrained due to carrier sense, as a trigger.

The wireless communication apparatus 100 according to the embodiment of the present invention, by changing the number of used communication channels accordingly, is able to respite the reduction of communication throughput of itself. Moreover, it is possible to respite the reduction of communication throughput of other communication channels that the communication channel itself is interfering with. Furthermore, the communication does not break, since this method only changes the used communication bandwidth.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-335222 filed Dec. 26, 2008 which is hereby incorporated by reference herein in its entirety.

What is claimed is:

1. A wireless communication apparatus that performs communication using one or more communication channels, comprising:
   a transmission unit configured to periodically transmit data;
   a computer-readable memory constructed to store computer-executable process steps; and
   a processor constructed to execute the computer-executable process steps stored in the memory,
   wherein the process steps stored in the memory cause the processor to:
   detect an occurrence of interference in a communication channel used by the apparatus, the interference being due to another communication apparatus;

wherein the transmission unit is configured to restrain transmission of data when the occurrence of interference is detected;

wherein the process steps stored in the memory further cause the processor to calculate a remaining time to transmit the restrained data, based on a time period during which the restrained data is to be transmitted and a length of the restrained time, to determine whether transmission of the restrained data will be completed within the remaining time, based on the length of the restrained time and an estimated time period required for the transmission of the restrained data, wherein it is determined that the transmission of the restrained data will not be completed within the remaining time if the length of the remaining time is less than the estimated time period, and to increase a total number of communication channels used by the apparatus in a case that it is determined that the transmission of the restrained data will not be completed within the remaining time.

2. The apparatus according to claim 1, wherein the process steps stored in the memory further cause the processor to measure the length of the restrained time in response to the detection of the occurrence of interference.

3. The apparatus according to claim 1, wherein the process steps stored in the memory further cause the processor to estimate the time period required for the transmission of the restrained data.

4. The apparatus according to claim 1, wherein the number of communication channels is increased when a predetermined number of determinations is made that the transmission of the restrained data will not be completed within the remaining time.

5. The apparatus according to claim 1, wherein the number of communication channels is increased by allowing the apparatus to additionally use a communication channel adjacent to a communication channel currently being used by the apparatus.

6. The apparatus according to claim 1, that performs communication conforming with IEEE 802.11 series.

7. A wireless communication method performed by a wireless communication apparatus using one or more communication channels, the method comprising:

periodically transmitting data;

detecting an occurrence of interference in a communication channel used by the apparatus, the interference being due to another communication apparatus;

restraining transmission of data when the occurrence of interference is detected;

calculating a remaining time to transmit the restrained data, based on a time period during which the restrained data is to be transmitted and a length of the restrained time;

determining, whether transmission of the restrained data will be completed within the remaining time, based on the length of the restrained time and an estimated time period required for the transmission of the restrained data, wherein it is determined that the transmission of the restrained data will not be completed within the remaining time if the length of the remaining time is less than the estimated time period; and increasing a total number of communication channels used by the apparatus in a case that it is determined that the transmission of the restrained data will not be completed within the remaining time.

8. A non-transitory computer-readable storage medium storing a computer program that causes a wireless communication apparatus using one or more communication channels to perform a method comprising:

periodically transmitting data;

detecting an occurrence of interference in a communication channel used by the apparatus, the interference being due to another communication apparatus;

restraining transmission of data when the occurrence of interference is detected;

calculating a remaining time to transmit the restrained data, based on a time period during which the restrained data is to be transmitted and a length of the restrained time;

determining whether transmission of the restrained data will be completed within the remaining time, based on the length of the restrained time and an estimated time period required for the transmission of the restrained data, wherein it is determined that the transmission of the restrained data will not be completed within the remaining time if the length of the remaining time is less than the estimated time period; and increasing a total number of communication channels used by the apparatus in a case that it is determined that the transmission of the restrained data will not be completed within the remaining time.

9. The apparatus according to claim 1, wherein the total number of communication channels used by the apparatus is increased in a case that the increase of the total number of communication channels causes the transmission of the certain data to complete by the certain time.

10. The apparatus according to claim 1, wherein the communication channels used by the apparatus in a case that it is determined that the transmission of the restrained data will not be completed within the remaining time includes the communication channel in which the occurrence of interference has been detected.

* * * * *